United States Patent [19]

Fujii et al.

[11] Patent Number: 4,730,016

[45] Date of Patent: Mar. 8, 1988

[54] POLYOLEFIN-BASE RESIN COMPOSITION CONTAINING A VOLATILE RUST PREVENTIVE AMINE SALT USED FOR METAL-PRODUCT WRAPPING MATERIAL

[75] Inventors: Akira Fujii; Yasuhisa Isobe; Kenichi Hashiudo, all of Toyohashi, Japan

[73] Assignee: Aicerro Chemical Company Limited, Toyohashi, Japan

[21] Appl. No.: 851,162

[22] Filed: Apr. 14, 1986

[30] Foreign Application Priority Data

Apr. 19, 1985 [JP] Japan .................................. 60-82288

[51] Int. Cl.$^4$ ........................... C08K 5/35; C08K 5/52; C08K 5/17

[52] U.S. Cl. ...................................... 524/96; 523/177; 524/145; 524/236; 524/251; 524/252; 524/260; 524/288; 524/414; 524/417; 524/422; 524/428; 524/556; 524/559

[58] Field of Search ................ 523/177; 524/417, 236, 524/251, 252, 559, 556, 96, 428, 414, 422, 260, 145, 288; 525/330.2

[56] References Cited

U.S. PATENT DOCUMENTS

| | | | |
|---|---|---|---|
| 3,472,825 | 10/1969 | Walter et al. | 525/330.2 |
| 3,677,989 | 7/1972 | Jenkinson | 524/556 |
| 3,959,539 | 5/1976 | Waggoner | 525/330.2 |
| 4,124,549 | 11/1978 | Hashiudo et al. | 524/563 |
| 4,171,297 | 10/1979 | Hosaka et al. | 524/439 |
| 4,173,669 | 11/1979 | Ashida et al. | 524/556 |
| 4,540,736 | 9/1985 | Herten et al. | 524/556 |

FOREIGN PATENT DOCUMENTS

| | | | |
|---|---|---|---|
| 0099722 | 2/1984 | European Pat. Off. | 524/556 |
| 0004295 | 2/1972 | Japan . | |
| 0080430 | 7/1978 | Japan | 524/556 |
| 0114526 | 9/1979 | Japan | 524/556 |

OTHER PUBLICATIONS

Derwent Abs 86-268934/41, J61195979, 8-30-86.
Derwent Abs 84-167904/27, Sekisui Chemilwo KK, May 1984, J59091132.
Derwent Ab 83-3990K/17, Nitto, Sep. 1981, J58045054.

*Primary Examiner*—Herbert J. Lilling
*Attorney, Agent, or Firm*—Oblon, Fisher, Spivak, McClelland & Maier

[57] ABSTRACT

Disclosed herein is a resin composition obtained by mixing an olefin-base resin, which has in turn been obtained by partially neutralizing a free carboxyl group in a random copolymer of an $\alpha$-olefin and an $\alpha,\beta$-ethylenically-unsaturated monocarboxylic or dicarboxylic acid, with a volatile rust preventive in a specific amount or more. The resin composition has excellent rust preventive properties and can hence be used advantageously as a wrapping material for metal products.

8 Claims, No Drawings

POLYOLEFIN-BASE RESIN COMPOSITION CONTAINING A VOLATILE RUST PREVENTIVE AMINE SALT USED FOR METAL-PRODUCT WRAPPING MATERIAL

BACKGROUND OF THE INVENTION (1) Field of the Invention

This invention relates to a rust preventive resin composition suitable for use in formed or molded materials useful in covering, wrapping or packaging (hereinafter called "wrapping" collectively) various metal products which require rust prevention, such as films, sheets, tubes and other packaging containers.

(2) Description of the Prior Art

Sheets and films with a rust preventive applied thereto have conventionally been known.

They include, for example, sheet-like materials, such as paper and textile, with a rust preventive adhered or coated thereon or impregnated therein; films and sheets formed by subjecting a mixtures of a polyolefin-base resin and a rust preventive to melt extrusion molding; and the like.

The former rust preventive materials are however insufficient in rust preventive properties and the long acting property thereof in spite of the usual practice of incorporation of a rust preventive in relatively high contents, because the paper and textile as base materials have high breathability and moisture permeability by themselves. It is hence necessary to laminate a material having low breathability and moisture permeability, such as a polyethylene film, or otherwise to use an additional outer wrapping material, thereby resulting not only in complicated wrapping work but also in a disadvantage in respect to wrapping costs.

On the other hand, the latter rust preventive materials encounter difficulties in dispersing the rust preventive in the resin uniformly at high contents due to the poor compatibility of the rust preventive with the polyolefin-base resin. This approach is therefore accompanied by such drawbacks that it cannot provide films having high rust preventive properties and in addition, the transparency, heat-sealing characteristics and the like of the resultant films per se are deteriorated.

With a view toward overcoming such drawbacks, it has also been proposed to combine a polar resin such as ethylene-ethyl acrylate copolymer, ethylene-acrylic acid copolymer or ethylene-vinyl acetate copolymer with a polyolefin-base resin so as to produce a rust preventive film improved in the compatability and dispersibility of its associated rust preventive with respect to the resin (Japanese Patent Publication No. 4295/1972). Although films obtained in accordance with this process are free of exudation or bleeding and exhibit long-acting rust preventive effects, they involve some practical problems as rust preventive wrapping films for metal products since the polar resin is highly corrosive to non-polar resins such as polyethylene and its corrosive properties becomes remarkable especially when maintained in contact with metals. The above-mentioned corrosive properties of the polar resin can be reduced to a certain extent by using the rust preventive in a large amount. Such excessive use of the rust preventive however leads to another problem that the transparency and heat-sealing characteristics of films are inevitably deteriorated.

It has also been proposed to produce a rust preventive film by adding and mixing an organic amine and an acid with a polyolefin resin and then heating and melt-molding the resultant composition so that a volatile rust preventive consisting of the acid salt of the organic amine is formed by the reaction of the organic amine and acid in the course of the molding step, thereby allowing the rust preventive to be dispersed uniformly in the resin (Japanese Patent Publication No. 2449/1978). This process is very effective in dispersing the volatile rust preventive uniformly in the resin. It is however accompanied by such problems that the rust preventive undergoes bleeding to the surfaces of the film along the passage of time and hence deteriorates the transparency and heat-sealing characteristics of the film per se.

SUMMARY OF THE INVENTION

With a view toward solving the above-mentioned problems observed in rust preventive resin compositions useful as wrapping materials for metal products, an object of this invention is to provide a rust preventive resin composition which features extremely good compatibility between the resin itself and a volatile rust preventive and hence permits uniform dispersion of the rust preventive at a high content and when formed into a film, has excellent properties as a wrapping material such as excellent rust preventive effects and good heat-sealing characteristics.

The present inventors have carried out an investigation on such resin compositions and have succeeded in obtaining a rust preventive resin composition having the above-described properties and characteristics by selecting and using a polyolefin-base resin, which has been obtained by neutralizing to a specific degree a free carboxyl group in a random copolymer of an α-olefin and an α,β-ethylenically-unsaturated monocarboxylic or dicarboxylic acid with ions of an alkali metal or alkaline earth metal having a normal electrode potential lower than aluminum, and adding and mixing a volatile rust preventive with the polyolefin-base resin, leading to completion of this invention.

The present invention will hereinafter be described in detail.

DETAILED DESCRIPTION OF THE INVENTION

The present invention provides a rust preventive resin composition suitable for use in a wrapping material, comprising:

an olefin-base resin obtained by partially neutralizing a free carboxyl group in a random copolymer of an α-olefin and an α,β-ethylenically-unsaturated monocarboxylic or dicarboxylic acid, the latter being contained in an amount of 1.0–20 mole %, with ions of an alkali metal or alkaline earth metal having normal electrode potential lower than aluminum to a level in a range of 5–90 mole % based on the original content of the free carboxyl group; and a volatile rust preventive in an amount of at least 0.5 parts by weight per 100 parts by weight of the olefin-base resin.

As exemplary α-olefins useful in obtaining the above random copolymer, may be mentioned ethylene and propylene. Illustrative of the α,β-ethylenically-unsaturated monocarboxylic acid may include acrylic acid and methacrylic acid, while maleic acid, fumaric acid and the like may be mentioned as examples of the α,β-ethylenically-unsaturated dicarboxylic acid.

As exemplary volatile rust preventives useful in the practice of this invention, may be mentioned amine salts of organic and inorganic acids, such as diisopropylammonium nitrite, dicyclohexylammonium nitrite, morpholinoammonium nitrite, cyclohexylammonium phosphate, cyclohexylammonium carbonate, isopropylammonium benzoate, 2-butylammonium benzoate, cyclohexylammonium benzoate and dicyclohexylammonium laurate.

In the random copolymer which is used to obtain the olefin-base resin in the present invention, the content (copolymerization ratio) of the monomeric carboxylic acid is 1.0–20 mole %, preferably, 2–10 mole %. If the content of the monomeric carboxylic acid is lower than 1.0 mole %, the compatibility between the resin and volatile rust preventive is reduced so that it is no longer feasible to incorporate the rust preventive at a high content in the resin. On the other hand, any contents greater than 20 mole % lead to inferior processability of the resin itself.

The neutralization of the free carboxyl group in such a random copolymer with alkali metal ions or alkaline earth metal ions such as sodium ions or magnesium ions is partially effected so as to lower the content of the free carboxyl group to 5–90 mole %, preferably, 10–70 mole % based on its original content. If this neutralization is limited to a level lower than 5 mole %, no improvement can be observed in the rust preventive properties. On the other hand, any levels higher than 90 mole % result in a reduction to the fluidity of the resin itself and hence lead to processing and molding difficulties.

Volatile rust preventives may be used either singly or in combination in the present invention. It is particularly preferred from the viewpoint of rust preventive effects to use a quick-acting volatile rust preventive having a high vaporization velocity in combination with a volatile rust preventive having a low vaporization velocity and hence slow-acting but long-lasting property.

In the present invention, the compatibility of these volatile rust preventives with the polyolefin-base resin are extremely good. Each of these rust preventives can be added up to 50 wt. % based on the resin without its loss through vaporization during the molding and processing of the resin and moreover, without deterioration to the transparency and heat-sealing characteristics of the molded product. Taking the susceptibility of wrapped metal products to corrosion and rust preventive effects into consideration, it is practically necessary to use the rust preventive in an amount of at least 0.5 parts by weight, and preferably, up to about 30 parts by weight per 100 parts by weight of the resin.

Upon forming or molding the resin composition composed by mixing the volatile rust preventive with the olefin-base resin, it is possible to incorporate known additives such as one or more pigments, antioxidants, antistatic agents, lubricants, anti-blocking agents, flame retardants and/or the like in the present invention. The resin composition of this invention can be obtained by mixing the volatile rust preventive with the polyolefin-base resin in the form of pellets or powder by suitable mixing means and then compounding them by means of a Banbury mixer, mixing roll kneader, kneader or the like.

The molding of the resin composition can be effected by processing the above-obtained compound with a usual melt molding apparatus, for example, a screw extruder, injection molding machine, calender roll or the like. Without forming the resin and rust preventive into a compound, they may be charged as a mixture directly in a molding machine for their molding. As a further alternative, it is also possible to prepare an emulsion of the resin, to dissolve or disperse the volatile rust preventive in the emulsion, to apply the resultant coating formulation to at least one surface of a suitable base material, for example, a film of a resin such as polypropylene, nylon or polyester, and then to dry the thus-coated base material.

The resin composition may be formed or molded into various shapes such as films, sheets, tubes, bottles and containers by usual methods such as melt molding, coating treatment, etc. It is also feasible, with a view toward obtaining formed or molded products having improved strength, to provide them in multilayered structures by using a co-extruder or by using the laminating technique.

Rust preventive properties of rust preventive resin compositions of this invention will next be described.

When a metal is wrapped and stored by using a film which has been obtained by forming a conventional specific resin composition composed of a polyolefin-base resin and the above-mentioned volatile rust preventive formed of the salt of the acid and amine, the volatile rust preventive mixed in the resin remain well-dispersed in the resin and is allowed to vaporize gradually under low-humidity conditions where rusting is generally hard to occur. The resultant vapor then covers the surface of the metal, thereby exhibiting its intended effects as a volatile rust preventive.

When a metal is however wrapped and stored by using the above-described film in a high-temperature and high-humidity environment which is suitable for inducing rust, it is extremely difficult to prevent occurrence of rust completely by depending solely on the action of a volatile rust preventive.

When a metal is wrapped and stored, in a rust-inducing environment such as that mentioned above, by using a film which has been obtained by forming the polyolefin-base resin composition of this invention, the resin composition partly undergoes hydrolysis due to the existence of water absorbed as moisture in the high-temperature and high-humidity environment. As a result, the components of the resin composition, i.e., the carboxylic acid (a), metal ions (b), volatile rust preventive (a') and amine (b') undergo a salt interchange reaction to form new salts (ab') and (a'b).

Of these salts, the metal salt of the acid (a'b) serves as an in-contact rust preventive upon its contact with the metal. As a result, the polyolefin-base resin composition of this invention can exhibit surprisingly-good, synergistic rust preventive effects even in a high-temperature and high-humidity environment where such rust preventive effects can never be achieved by a volatile rust preventive only.

Since the present invention can provide a resin composition permitting uniform dispersion of a volatile rust preventive at a high content, capable of providing a film, sheet or the like having good transparency and heat-sealing characteristics by itself and hence suitable for use in the production of a wrapping material with excellent rust preventive effects, the present invention is believed to be advantageous for the rust preventive wrapping of metal products. The present invention and its effects will hereinafter be described specifically by the following Examples and Comparative Examples, in which all designations of "part" or "parts" mean part or parts by weight unless otherwise specifically indicated.

EXAMPLE 1

To 100 parts of pellets of a sodium ion salt resin (M.I.=1.0; density=0.945; "COPOLENE S-400", trade name; commercial product of Asahi-Dow, Limited) of an ethylene-acrylic acid copolymer, 5 parts of cyclohexylammonium benzoate were added and mixed. The resultant resin composition was formed at an extrusion temperature of 140°–160° C. into a tubular film having a thickness of 0.1 mm by an inflation extruder. The thus-obtained film had good transparency and upon its extraction with warm water, the formation of sodium benzoate was confirmed.

EXAMPLES 2–3

To 100 parts of a base resin consisting of powder of a sodium salt resin (M.I.=2.8; density=0.95; "HI-MILAN 1605", trade name; commercial product of Du Pont-Mitsui Polychemicals Co., Ltd.) of an ethylene-methacrylic acid copolymer or powder of a magnesium salt resin (M.I.=0.9; density=0.940; "COPOLENE D-200", trade name; commercial product of Asahi-Dow, Limited) of an ethylene-acrylic acid copolymer, 10 parts of dicyclohexylammonium nitrite were added and mixed. By a T-die extruder, the resultant resin composition was formed at an extrusion temperature of 140°–160° C. into a film having a thickness of 0.1 mm.

The thus-obtained films were good in transparency and upon their extraction with warm water, the formation of sodium nitrite and that of magnesium nitrite were confirmed.

EXAMPLE 4

To 100 parts of a base resin consisting of powder of the sodium salt resin (M.I.=2.8; density=0.95; "HI-MILAN 1605", trade name; commercial product of Du Pont-Mitsui Polychemicals Co., Ltd.) of the ethylene-methacrylic acid copolymer, 5 parts of dicyclohexylammonium phosphate were added and mixed. By an inflation extruder, the resultant mixture was formed at an extrusion temperature of 140°–160° C. into a film having a thickness of 0.1 mm. The film was good in transparency and upon its extraction with warm water, the formation of sodium phosphate was confirmed.

COMPARATIVE EXAMPLES 1–3

To 100 parts of a low-density polyethylene (M.I.=1.0, density=0.920; "YUKALON YF-30", trade name; commercial product of Mitsubishi Petrochemical Co., Ltd.), an ethylene-ethyl acrylate copolymer resin (M.I.=1.5; density=0.93; "DPDJ-6182", trade name; commercial product of Nippon Unicar Co., Ltd.) or a zinc salt resin (M.I.=1.5; density=0.94; "HI-MILAN 1650", trade name; commercial product of Du Pont-Mitsui Polychemicals Co., Ltd.) of an ethylene-methacrylic acid copolymer as a base resin, 5 parts of cyclohexylammonium benzoate were added and mixed in the same manner as in Example 1. Following the procedure of Example 1, a film having a thickness of 0.1 mm was formed. In the film obtained by using the low-density polyethylene as a base resin (Comparative Example 1), the state of dispersion of the added rust preventive was extremely poor and the film was hence whitened. In each of the films obtained respectively by using the ethylene-ethyl acrylate copolymer resin (Comparative Example 2) and the zinc salt resin of the ethylenemethacrylic acid copolymer (Comparative Example 3) as base resins, the state of dispersion of the rust preventive was relatively good.

COMPARATIVE EXAMPLE 4

To 100 parts of the same base resin as that employed in Comparative Example 2, were added 5 parts of cyclohexylammonium benzoate as a vapor-phase rust preventive and 1 part of sodium benzoate as an in-contact rust preventive. The resultant mixture was formed into a film having a thickness of 0.1 mm in the same manner as in Example 1. In the thus-obtained film, the dispersion of the sodium benzoate was poor and a number of white spots occurred in the film.

COMPARATIVE EXAMPLE 5

To 100 parts of the same ethylene-ethyl acrylate copolymer resin as that employed in Comparative Example 2, 10 parts of dicyclohexylammonium nitrite were added and mixed. Following the same procedure as in Examples 2–3, a film having a thickness of 0.1 mm was formed. The rust preventive bled partly in the thus-obtained film, and the film lost transparency significantly.

The compositions and performance of the films obtained in Examples 1–4 and Comparative Examples 1–5 are summarized in Tables 1 and 2 respectively.

The rust preventive effects of each film shown in Table 2 were evaluated by the following testing method.

Testing method:

By using two cold-rolled steel sheets (60 mm × 80 mm × 1 mm) prescribed in JIS G-3141, they were fastened to each other in their four corners by iron screws in such a way that they were parallel to each other with an interval of 25 mm, thereby fabricating a structure as a sample to be wrapped. After washing samples of the same structure with warm naphtha and warm methanol in order, they were wrapped by the individual films and hermetically sealed by heat-sealing the films. The thus-wrapped samples were suspended in a humidity cabinet maintained at 50°±1° C. and 100% RH to conduct an accelerated test for 120 days. In order to evaluate the in-contact rust preventive properties and vapor-phase rust preventive properties at the same time, the above-mentioned structure was used as the sample to be wrapped. Namely, the mutually-facing surfaces (inner surfaces) of both sheets permitted evaluation of the vapor-phase rust preventive properties because they did not contact the film directly. The opposite surfaces (outer surfaces) were brought into direct contact with the film, thereby enabling evaluation of the in-contact rust preventive properties.

TABLE 1

| | Film Composition | |
|---|---|---|
| | Base resin | Volatile rust preventive (content) |
| Example 1 | Ethylene-acrylic acid sodium salt copolymer | Cyclohexylammonium benzoate (5) |
| Example 2 | Ethylene-methacrylic acid sodium salt copolymer | Dicyclohexylammonium nitrite (10) |

TABLE 1-continued

| | Film Composition | |
|---|---|---|
| | Base resin | Volatile rust preventive (content) |
| Example 3 | Ethylene-acrylic acid magnesium salt copolymer | Dicyclohexylammonium nitrite (10) |
| Example 4 | Ethylene-methacrylic acid sodium salt copolymer | Dicyclohexylammonium phosphate (5) |
| Comp. Ex. 1 | Low-density polyethylene | Cyclohexylammonium benzoate (5) |
| Comp. Ex. 2 | Ethylene-ethyl acrylate copolymer | Cyclohexylammonium benzoate (5) |
| Comp. Ex. 3 | Ethylene-methacrylic acid zinc salt copolymer | Cyclohexylammonium benzoate (5) |
| Comp. Ex. 4 | Ethylene-ethyl acrylate copolymer | Cyclohexylammonium benzoate (5) Sodium benzoate (1) |
| Comp. Ex. 5 | Ethylene-ethyl acrylate copolymer | Dicyclohexylammonium nitrite (10) |

(1) The content of each rust preventive is expressed in terms of parts by weight per 100 parts by weight of its corresponding base resin.
(2) Each film thickness was 0.1 mm.

TABLE 2

| | Rust preventive effects (1) | | Haze (2) (%) | Strength of heat-seal, g/15 mm width (3) |
|---|---|---|---|---|
| | Surface in contact with film (contact) | Surface out of contact with film (vapor phase) | | |
| Ex. 1 | No rusting over 120 days | No rusting over 120 days | 13 | 1,700 |
| Ex. 2 | No rusting over 120 days | No rusting over 120 days | 18 | 1,950 |
| Ex. 3 | No rusting over 120 days | No rusting over 120 days | 8 | 2,040 |
| Ex. 4 | No rusting over 120 days | No rusting over 120 days | 15 | 1,500 |
| Comp. Ex. 1 | Rusted on 35th day | Rusted on 55th day | 55 | 390 |
| Comp. Ex. 2 | Rusted on 16th day | Rusted on 48th day | 25 | 520 |
| Comp. Ex. 3 | Rusted on 1st day | Rusted on 75th day | 18 | 1,600 |
| Comp. Ex. 4 | Rusted on 18th day | Rusted on 45th day | 49 | 430 |
| Comp. Ex. 5 | Rusted on 25th day | Rusted on 60th day | 37 | 330 |

(1) The percentage of rust occurred per unit area was determined by JIS Z-2912. The rust preventive effects are shown in terms of the number of days to reach 10%.
(2) Measurement was conducted following the method prescribed in ASTM D-1003.
(3) Measurement was conducted by a heat sealability testing machine manufactured by Toyo Tester Co., Ltd. Sealing conditions: temperature = 140° C., pressure = 2.0 kg/cm², time = 1.0 second.

The resin compositions of this invention had numerous practical merits as rust preventive wrapping materials such that they showed extremely good rust preventive effects compared with those employed in the Comparative Examples and composed in combination with the other polar resins and their formed products, namely, films were by themselves good in transparency and heat-sealing characteristics as readily envisaged from Table 2; and moreover, they featured easy processing upon production of the films without developing the problem of environmental contamination due to smoking, scattering and the like of the volatile rust preventives by their evaporation.

We claim:

1. A rust preventive resin composition suitable for use in wrapping material, comprising:
   an olefin-base resin obtained by partially neutralizing a free carboxyl group in a random copolymer of an α-olefin and an α,β-ethylenically-unsaturated monocarboxylic or dicarboxylic acid, the latter being contained in an amount of 1.0-2.0 mole %, with ions of an alkali metal or alkaline earth metal having a normal electrode potential lower than aluminum to a level in a range of 5-90 mole% based on the original content of the free carboxyl group; and
   a votive rust preventive selected from one or more amine salt compounds in an amount of at least 0.5 parts by weight per 100 parts by weight of the olefin-base resin.

2. A rust preventive resin composition according to claim 1, wherein the ions are sodium ions or magnesium ions.

3. A rust preventive resin composition according to claim 1, wherein the volatile rust preventive is selected from the group consisting of amine salts of organic carboxylic acids, nitrous acid, phosphoric acid and carbonic acid.

4. A rust preventive resin composition according to claim 1, wherein the volatile rust preventive is an amine salt of an organic carboxylic acid.

5. A rust preventive resin composition according to claim 1, wherein the volatile rust preventive is an amine salt of nitrous acid.

6. A rust preventive resin composition according to claim 1, wherein the volatile rust preventive is an amine salt of phosphoric acid.

7. A rust preventive resin composition according to claim 1, wherein the volatile rust preventive is an amine salt of carbonic acid.

8. A rust preventive resin composition acording to claim 1, wherein the volatile rust preventive is a volatile rust preventive having a high vaporization velocity in combination with a volatile rust preventive having a low vaporization velocity.

* * * * *